United States Patent [19]
Nalur

[11] Patent Number: 6,060,094
[45] Date of Patent: May 9, 2000

[54] METHOD OF REDUCING FAT IN FAT-BASED COATING FOR CONFECTIONERY PRODUCTS

[75] Inventor: Shantha Chandrasekaran Nalur, Dublin, Ohio

[73] Assignee: Nestec S.A., Vevey, Switzerland

[21] Appl. No.: 09/182,928

[22] Filed: Oct. 30, 1998

[51] Int. Cl.$^7$ ..................................... A23D 7/005
[52] U.S. Cl. .......................... 426/89; 426/631; 426/660
[58] Field of Search .................................. 426/660, 631, 426/100, 101, 607, 89

[56] References Cited

U.S. PATENT DOCUMENTS

| | | | |
|---|---|---|---|
| 5,215,780 | 6/1993 | Meidenbauer | 426/100 |
| 5,288,512 | 2/1994 | Seiden | 426/607 |
| 5,556,652 | 9/1996 | Cherukuri | 426/651 |
| 5,633,027 | 5/1997 | Cherukuri | 426/651 |
| 5,744,180 | 4/1998 | Cherukuri | 426/607 |
| 5,849,352 | 12/1998 | Baker | 426/607 |
| 5,858,427 | 1/1999 | Cain | 426/101 |

OTHER PUBLICATIONS

Minifie 1989 Chocolate, Cocoa, and Confectionery: Science and Technology 3rd edition AVI Publishing Chapman & Hall New York pp. 117–129, 165–178.

Beckett 1988 Industrial Chocolate Manufacture and Use 2nd edition Blackie Academic & Professional New York pp. 139–142, 146–154, 273–275.

Brochure of Neobee® Medium Chain Triglycerides—Special Performance Ingredients, Feb. 1997, by Stepan Food Ingredients Department, Maywood, NJ (4 pgs.).

Berger, Kurt, "Palm Oil Products—Why and How to Use Them," *Food Technology*, Sep. 1986, pp. 72–79.

Shukla, V.K.S., "Chap. 3: Confectionery Fats," *Developments in Oils and Fats*, 1995, pp. 66–94.

Traitler et al., "Palm Oil and Palm Kennel Oil in Food Products," *Journal of the American Oil Chemists Society*, vol. 62, No. 2, Feb. 1985, pp. 417–421.

*Primary Examiner*—Carolyn Paden
*Attorney, Agent, or Firm*—Pennie & Edmonds LLP

[57] ABSTRACT

A method for reducing the fat content in a fat-based confectionery coating material having a sufficient viscosity, when liquified, to permit the application and retention of the coating material upon an underlying confectionery substrate. The method comprises replacing at least a portion of at least one fat-containing component of the coating material with an amount of a liquid medium chain triglyceride sufficient to maintain the viscosity of the coating material.

12 Claims, No Drawings

METHOD OF REDUCING FAT IN FAT-BASED COATING FOR CONFECTIONERY PRODUCTS

TECHNICAL FIELD

The invention relates to a method of reducing the amount of fat in fat-based coatings for confectionery products while maintaining a desired viscosity level of the coating by replacing a portion of the fat-containing components of such coatings with one or more liquid medium chain triglycerides.

BACKGROUND OF THE INVENTION

Typically, coatings used for confectionery products, such as frozen, fat-based desserts, e.g., an ice lolly, bar, morsel, cone, cup or cake, are composed of fat-containing substances. One class of coating materials commonly used for such purpose are the chocolates, i.e., plain chocolate, milk chocolate and white chocolate, which are based on cocoa butter. Another class of coating materials well known in the art are the so-called "compound" coating materials wherein some or all of the cocoa butter has been replaced by alternative fat compositions, such as cocoa butter equivalents ("CBE"), cocoa butter substitutes ("CBS") and/or cocoa butter replacers ("CBR"). For a detailed discussion of these types of alternative fats see, for example, Traitler, H. et al., *Journal of the American Oil Chemists Society*, 62(2), 417–21 (1985); Shukla, V., *Developments in Oils and Fats*, 66–94 (1995); Berger, K., *Food Technology*, 40(9), 72–79 (1986), the disclosures of which are incorporated herein by reference.

In practice, the coating material is melted or otherwise liquified, and the frozen desserts are dipped into or otherwise coated with the liquified coating, such as by spraying or enrobing. The fat of the coating congeals on contact with the frozen dessert to form a coating over all or a portion of the dessert. During the coating process, the apparent viscosity (referred to hereinafter as simply the "viscosity") of the melted coating must be maintained within narrow limits to ensure that the proper amount of coating material is picked up by the frozen confection.

Coatings comprising a substantial amount of fat, however, often display properties that are unsatisfactory to the consumer and/or the product producer. Such properties include the tendency to break, flake or rub off during production or consumption and/or to soften too much in the hand of the consumer. In addition, a further important consideration with the use of fat-based coatings such as chocolate is the amount of calories the coating contributes to the frozen dessert. For example, a typical chocolate coating for an ice cream bar contains about 80 calories per bar. The largest portion of the calories comes from the fat which accounts for approximately 60% of the coating. Calorie-conscious consumers, however, demand coatings with a lower amount of calories. One way to reduce the calorie content of such coatings is to reduce the amount of fat therein. Care must be taken when doing so, however, since adjusting the composition of the coating may substantially affect the viscosity and the resultant rheology of the coating, which may, in turn, affect the quantity and/or the quality of the coating applied to a particular confection.

It would therefore be desirable to provide a fat-based coating confection with a reduced tendency to break, flake or rub off the underlying substrate, and having a reduced calorie content attained by reducing the amount of fat present in the fat-based coating wherein such composition maintains a sufficient viscosity to permit application thereof upon, e.g., a frozen dessert through the use of techniques such as those disclosed above. As taught herein, the method of the present invention results in formation of fat-based coating compositions for confections, such as ice cream, which fulfill the long-felt need for such less brittle, reduced fat coatings.

SUMMARY OF THE INVENTION

The invention is directed, in a first embodiment, to a method for reducing the fat content in a fat-based confectionery coating material wherein the coating material has a sufficient viscosity, when liquified, to permit application and retention of the coating material upon an underlying confectionery substrate. The method comprises replacing at least a portion of at least one fat-containing component of the coating material with an amount of a liquid medium chain triglyceride which is sufficient to maintain the viscosity of the liquified coating composition at a desired level and applying the resultant coating material upon at least a portion of the confectionery substrate.

In a preferred embodiment of the invention, the viscosity of the liquified coating material is adjusted to a range of from about 100 to about 5,000 centipoise by the replacement of up to about 35 weight percent of the fat in the composition with from about 0.5 to about 40 weight percent of the liquid medium chain triglyceride. In alternate embodiments of the invention the viscosity of the liquified coating composition may range between about 100 and 3,000 centipoise and, even more preferably, between about 100 and 2,000 centipoise. In another embodiment, the amount of fat replaced may be up to about 30 weight percent of the coating, or alternately, up to about 25 weight percent of the coating with about a 20 weight percent reduction being most preferred. To achieve these reductions, the liquid medium chain triglycerides may alternately be added in amounts ranging between about 3–20 weight percent, or alternately between about 3–10 weight percent. Approximately three percent by weight of the fat in the fat-containing component(s) may be replaced per each one percent by weight of liquid MCT added to the composition.

In a further preferred embodiment of the invention, the confectionery substrate is a frozen, fat-based confection.

DETAILED DESCRIPTION OF THE INVENTION

It is noted that, for ease of understanding the invention, the method for reducing fat in fat-based coatings for confectionery products is described herein with regard to a specific application for applying a coating to a frozen fat-based confection such as an ice cream cone. However, the method of the invention is not limited to use for coating ice cream, as coatings such as those contemplated herein may be readily adapted for application to a variety of alternate underlying confectionery materials to serve as substrates, which may or may not be frozen.

The invention as thus exemplified herein is therefore directed to a method for reducing the level of fat in fat-based coating confections for application to, e.g., a frozen ice cream cone or bar, by replacing a portion of the fat-containing component of such coating confection(s) with a desired amount of a liquid medium chain triglyceride ("MCT"). Moreover, the incorporation of the liquid MCT into the coating composition, additionally permits the viscosity of the molten coating composition, i.e., prior to the application, to be adjusted to within a desired range for facilitating the coating process, and further, renders the resultant coating(s) less brittle and thus, less likely to break, flake or rub off.

A medium chain triglyceride or MCT as that term is used herein, refers to a saturated fat containing from 6–12 carbon atoms. More particularly MCTs comprise substantially 100% C8–C10 fatty acid triglycerides. MCTs are preferably produced by esterifying glycerol with medium chain fatty acids. MCT materials useful in the invention are available, for example, from the Stepan Company of Northfield, Ill. under the trademark NEOBEE®, e.g., NEOBEE® 1095.

An important consideration when lowering the proportion of fat in coating confections in accordance with the method of the invention is the viscosity of the coating material in its molten state. This parameter is particularly important in coating frozen confections, e.g. ice creams which are typically coated by a dipping process, since the viscosity of the coating material bears directly upon its rheology and thus will affect the amount and texture of the coating applied to the substrate. In practice, the viscosity of the coating composition is measured using a Brookefield viscometer. The data obtained at several viscometer speeds are used to calculate the yield value, i.e., the viscosity at zero shear weight, and the Plastic Viscosity (defined as the rate of change of viscosity with respect to the shear rate). From these values may be determined the Apparent Viscosity ("the viscosity").

Generally, high fat compositions have a relatively low viscosity. Reducing the fat level, however, tends to raise the viscosity of the coating. The addition of liquid medium chain triglycerides tends to lower the viscosity of the coating material to a level closer to that of coating materials containing higher levels of fat. The desired viscosity depends upon a number of considerations, including the nature of the underlying confection and the coating composition itself. The desirable (apparent) viscosity for coatings produced according to the method of the invention ranges from about 100 to about 5000 centipoise. A more preferred range is from about 100 to about 3000 centipoise, whereas the most preferred range is from about 100 to about 2000 centipoise. The determination of whether the coating composition has the proper viscosity for a particular application is made by checking the amount of coating picked up, e.g., by the frozen confection, during the coating operation. This amount may differ on a product by product basis according to the product to be coated. One of ordinary skill in the coating art would readily understand how to attain a desired viscosity for a particular application to permit sufficient coating pick-up without the need for any undue experimentation.

While it is theoretically possible to remove up to about 35 wt. percent of the fat from a coating composition of the type contemplated herein, it is more preferred to remove only up to about 30 weight percent of the fat, and most preferred to remove no more than about 25 wt. percent. That is because removal of greater than about 35 wt. percent of the fat has a substantial negative impact on the coating performance under normal processing conditions, as well as upon the texture of the coating composition once it is solidified upon the substrate.

Depending upon the proportion of fat one desires to remove, one may add from about 0.5 to about 40 wt. percent of the MCT to the coating composition in accordance with the method of the invention. More preferably, the amount to be added ranges from about 3 to about 20 weight percent. Most preferably, the range is from about 3 to about 10 weight percent. As demonstrated in the examples which follow, approximately 3% of fat may be removed for each 1% of MCT added. The amounts above are in percent by weight.

EXAMPLES

The following Examples are provided for the purpose of illustration only and are not to be construed as limiting the invention in any manner.

Example 1

This example sets forth the composition of a "control" composition comprising a compound coating containing 62% fat with no MCT.

| Ingredient | Amount (in % by wt.) |
|---|---|
| (1) Sugar | 21.46% |
| (2) Coconut oil (Nutresca brand 51-25, 76° C.) | 40.75% |
| (3) Partially hydrogenated soybean oil (Durkex brand 100 with tertiary butylated hydroxy quinone antioxidant) | 20.08% |
| (4) DeZaan Co. natural cocoa (10–12% fat) | 10.04% |
| (5) Russell Stover Cocoa Liquor | 0.31% |
| (6) Whey Solids | 6.96% |
| (7) Vanillin | 0.04% |
| (8) Milk Solids | 0.36% |
| Total | 100.00% |

Example 2

This example provides a compound coating similar to that set forth in Example 1, except that the fat proportion has been reduced from 62% to 50% with the addition of 3.4 wt. percent MCT.

| Ingredient | Amount (in % by wt.) |
|---|---|
| (1) Sugar | 36.52% |
| (2) Coconut oil (Nutresca brand 51-25, 76° C.) | 29.35% |
| (3) Partially hydrogenated soybean oil (Durkex brand 100 with tertiary butylated hydroxy quinone antioxidant) | 14.73% |
| (4) DeZaan Co. Natural cocoa (10–12% fat) | 15.00% |
| (5) Russell Stover Cocoa Liquor | 0.45% |
| (6) Medium Chain Triglyceride | 3.42% |
| (7) Vanillin | 0.05 |
| (8) Lecithin | 0.48% |
| Total | 100.00% |

As demonstrated in Table 1 below, up to approximately 3 wt. percent of fat may be eliminated per 1% by wt. of MCT added without negatively affecting the coating material or its properties.

Example 3

This example is similar to Example 2 except that, in the present example, 12% of the fat (i.e., a reduction from 62% to 50%) has been replaced by 5.36 wt. percent of the MCT oil.

| Ingredient | Amount (in % by wt.) |
|---|---|
| (1) Sugar | 36.54% |
| (2) Coconut oil (Nutresca brand 51-25, 76° C.) | 28.05% |
| (3) Partially hydrogenated soybean oil (Durkex brand 100 with tertiary butylated hydroxy quinone antioxidant) | 14.07% |
| (4) DeZaan Co. Natural cocoa (10–12% fat) | 15.00% |
| (5) Russell Stover Cocoa Liquor | 0.45% |
| (6) Medium Chain Triglycerides | 5.36% |
| (7) Vanillin | 0.05 |
| (8) Lecithin | 0.48% |
| Total | 100.00% |

As evidence that the substitution of MCT for the fat in the fat-based coating confections of the invention does not negatively impact upon the properties of the resultant coating composition, Table 1 compares the weight pick up, plastic viscosity, yield stress and apparent viscosity of the coatings set forth in Examples 1–3.

TABLE 1

| Coating Composition | Pick-up Weight (gms.) | Plastic Viscosity[1] (cP) | Yield Stress[1] (D/cm$^2$) | Apparent Viscosity[2] (cP) |
|---|---|---|---|---|
| Control (Ex. 1) | 6.00 | 80–90 | 0.5–2.0 | 200–250 |
| Example 2 | 5.95 | 180–220 | 0.1–0.3 | 220–250 |
| Example 3 | 5.85 | 140–160 | 0.4–1.4 | 250–300 |

[1]Plastic Viscosity and Yield Stress were calculated using the software provided by Brookefield Engineering Laboratories, Inc.
[2]Apparent Viscosity is given at 20 RPM.

As can be seen from the values provided in Table 1, the properties obtained for the lower fat coatings produced by the method of the invention are substantially similar to those achieved with the control, i.e., 62% fat, coating material.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method for reducing fat content in a fat based confectionery coating material having a sufficient viscosity, when liquified, to permit application and retention of said coating upon a confectionery substrate, which method comprises replacing at least a portion of at least one fat-containing component of said coating material with an amount of a composition consisting essentially of a liquid medium chain triglyceride, said amount being sufficient to maintain said viscosity of said coating when liquified to between about 100 and about 5000 centipoise, and applying the resultant coating material upon at least a portion of the confectionery substrate.

2. The method according to claim 1, which further comprises maintaining the viscosity of the liquified coating material at between about 100 and about 3,000 centipoise.

3. The method according to claim 2, which further comprises maintaining the viscosity of the liquified coating material at between about 100 and about 2,000 centipoise.

4. The method according to claim 1, which further comprises selecting, as the confectionery substrate, a frozen, fat-based confection.

5. The method according to claim 1, wherein a sufficient amount of the liquid medium chain triglyceride is added to the coating material to replace up to about 35 weight percent of said at least one fat-containing component.

6. The method according to claim 1, wherein a sufficient amount of the liquid medium chain triglyceride is added to the coating material to replace up to about 30 weight percent of said at least one fat-containing component.

7. The method according to claim 1, wherein a sufficient amount of the liquid medium chain triglyceride is added to the coating material to replace up to about 25 weight percent of said at least one fat-containing component.

8. The method according to claim 1, which further comprises adding 1 percent by weight of the liquid medium chain triglyceride to said liquified coating composition for each 3 percent or less by weight of fat of the fat-containing component that it is desired to replace.

9. The method according to claim 8, wherein from about 0.5 to about 40 weight percent of liquid medium chain triglyceride are added to the liquified coating composition.

10. The method according to claim 8, wherein from about 3 to about 20 weight percent of liquid medium chain triglyceride are added to the liquified coating composition.

11. The method according to claim 8, wherein from about 3 to about 10 weight percent of liquid medium chain triglyceride are added to the liquified coating composition.

12. A method for reducing fat content in a fat-based confectionery coating material having a sufficient viscosity, when liquified, to permit application and retention of said coating upon an underlying confectionery substrate, which method comprises replacing a portion of at least one fat-containing component of said coating material with an amount of a liquid medium chain triglyceride ranging between about 0.5 and about 40 percent by weight of the coating composition to adjust the viscosity thereof to a range of between about 100 and about 5,000 centipoise and applying the resultant coating material upon at least a portion of the confectionery substrate.

* * * * *